US008908506B2

(12) United States Patent
Wan

(10) Patent No.: US 8,908,506 B2
(45) Date of Patent: Dec. 9, 2014

(54) METHOD AND SYSTEM FOR SWITCHING APS SERVICE CHANNEL AND AUTOMATIC PROTECTION SWITCHING DEVICE

(71) Applicant: Huawei Technologies Co., Ltd., Shenzhen (CN)

(72) Inventor: Quangao Wan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 13/667,419

(22) Filed: Nov. 2, 2012

(65) Prior Publication Data

US 2013/0128728 A1 May 23, 2013

Related U.S. Application Data

(63) Continuation of application No. PCT/CN2011/079848, filed on Sep. 20, 2011.

(51) Int. Cl.
H04L 1/00 (2006.01)
H04L 1/22 (2006.01)
H04L 12/24 (2006.01)

(52) U.S. Cl.
CPC .............. H04L 1/22 (2013.01); H04L 41/0663 (2013.01)
USPC .......................................... 370/228; 370/222

(58) Field of Classification Search
None
See application file for complete search history.

(56) References Cited

U.S. PATENT DOCUMENTS

| | | | | |
|---|---|---|---|---|
| 2005/0099941 | A1* | 5/2005 | Sestito et al. ................ | 370/228 |
| 2010/0110882 | A1* | 5/2010 | Murugan .................... | 370/225 |
| 2011/0044166 | A1* | 2/2011 | Lee et al. .................... | 370/223 |
| 2011/0292789 | A1* | 12/2011 | Long et al. .................. | 370/222 |

FOREIGN PATENT DOCUMENTS

| | | |
|---|---|---|
| CN | 1129261 C | 11/2003 |
| CN | 101662329 A | 3/2010 |
| CN | 102006188 A | 4/2011 |

OTHER PUBLICATIONS

International Search Report issued in corresponding PCT Patent Application No. PCT/CN2011/079848, mailed Jul. 5, 2012.
International Telecommunication Union, "Linear Protection Switching for Transport MPLS (T-MPLS) Networks" Series G: Transmission Systems and Media, Digital Systems and Networks, Series Y: Global Information Infrastructure, Internet Protocol Aspect and Next-Generation Networks. G.8131/Y.1382, Amendment 1, Sep. 2007.
Rouyer, "G.8031 Ethernet Linear Protection Switching" Joint ITU-T/IEEE Workshop on the Future of Ethernet Transport, IEEE, Geneva, May 28, 2010.

* cited by examiner

*Primary Examiner* — Andrew Lai
*Assistant Examiner* — Jamaal Henson
(74) *Attorney, Agent, or Firm* — Brinks Gilson & Lione

(57) ABSTRACT

A method and a system for switching an APS service channel, and an automatic protection switching device are disclosed. The method includes: a first recovered side reaches a wait-to-restore (WTR) state when the first recovered side receives information about transition to the WTR state from a second recovered side if a current state of the first recovered side is a first No Request (NR) state and if a state prior to transition to the first NR state is a Signal Fail (SF) state; and the first recovered side reaches a second NR state upon expiry of a WTR time of the first recovered side after receiving WTR time expiry information sent by the second recovered side. Therefore, the user can know the WTR state of the first recovered side clearly.

10 Claims, 3 Drawing Sheets

METHOD AND SYSTEM FOR SWITCHING APS SERVICE CHANNEL AND AUTOMATIC PROTECTION SWITCHING DEVICE

CROSS-REFERENCE TO RELATED APPLICATIONS

This application is a continuation of International Application No. PCT/CN2011/079848, filed on Sep. 20, 2011, which is hereby incorporated by reference in its entirety.

FIELD OF THE TECHNOLOGY

The present invention relates to a communication technology field, and in particular, to a method and a system for switching an APS service channel, and to an automatic protection switching device.

BACKGROUND

The automatic protection switching (Automatic Protection Switching, APS) G.8031 of Ethernet (Ethernet, ETH) defines 1+1/1:1, unidirectional/bidirectional, revertive/non-revertive switching modes, and sets forth various application scenarios and handling processes. As defined in G.8031, if the current protection group is under a 1+1 bidirectional revertive switching mode or 1:1 bidirectional revertive protection switching mode, a Signal Fail (Signal Fail, SF) alarm will trigger protection switching when a working channel fails, and the service will be switched from the working channel to a protection channel. When the working channel recovers later, the SF alarm disappears. To prevent switchback caused by the fault and jitters of the working channel, automatic protection switching (Automatic Protection Switching, APS) gets into a wait-to-restore (Wait to Restore, WTR) state first. The duration of the WTR depends on a WTR timer threshold (generally defined by a network maintainer). In the WTR time, if the working channel raises no SF alarm any more, the APS will jumps from the WTR state to a No Request (No Request, NR) (r/b=null) state. At this time, the service switches back to the working channel.

In the prior art, according to the G.8031/G.8131 protocol, in the switching process of the 1+1/1:1 bidirectional revertive mode, if two sides do not recover from the fault simultaneously, the first recovered side responds to the SF (r/b=normal) state of the second recovered side and gets into an NR (r/b=normal) state; upon receiving the information indicating that the first recovered side gets into the NR(r/b=normal) state, the second recovered side gets into a WTR state, and, upon expiry of a WTR timer, gets into the NR (r/b=null) state; at this time, the first recovered side responds to the NR (r/b=null) of the second recovered side, and also gets into the NR (r/b=null) state, and both sides switch back to the working channel. That is, when both sides do not recover simultaneously, the second recovered side gets into the WTR state, and, upon expiry of the WTR time, both sides switch back to the working channel simultaneously.

According to the technical solution in the prior art, the following problems are found in the prior art:

In the technical solution of the prior art, the first recovered side does not get into the WTR state, and therefore, the user is unable to know the WTR state of the first recovered side before the service is switched back to the working channel; and, if the WTR time set on the first recovered side is greater than the WTR time set on the second recovered side, the first recovered side possibly switches back to the working channel before the WTR time expires, which does not meet the customer requirement of switching back to the working channel upon expiry of the WTR time after the working channel is recovered.

SUMMARY

The objectives of the present invention are to provide a method for switching an APS service channel to solve the following problem in the prior art: In switching the APS service channel, the user is unable to know the WTR state of the first recovered side before the service is switched back to the working channel; and, if the WTR time set on the first recovered side is greater than the WTR time set on the second recovered side, the first recovered side possibly switches back to the working channel before the WTR time expires, which does not meet the customer requirement of switching back to the working channel upon expiry of the WTR time after the working channel is recovered.

The present invention is based on the following technical solutions. A method for switching an APS service channel in an embodiment of the present invention includes:
reaching, by a first recovered side, a WTR state upon receiving information about transition to the WTR state from a second recovered side if a current state of the first recovered side is a first NR state and if a state prior to transition to the first NR state is an SF state, where the first NR state is a No Request state of selecting a protection channel, and the SF state is a Signal Fail state of selecting a protection channel; and
reaching, by the first recovered side upon expiry of a WTR time of the first recovered side, a second NR state after receiving WTR time expiry information sent by the second recovered side, where the second NR state is a No Request state of selecting a working channel.

Further, another method for switching an APS service channel in an embodiment of the present invention includes:
sending, by a second recovered side upon reaching a WTR state, information about transition to the WTR state to a first recovered side to get the first recovered side into the WTR state; and
reaching, by the second recovered side upon expiry of a WTR time of the second recovered side, a second NR state after receiving WTR time expiry information sent by the first recovered side, where the second NR state is a No Request state of selecting a working channel.

Further, another method for switching an APS service channel in an embodiment of the present invention includes:
sending, by a second recovered side upon reaching a WTR state, information about transition to the WTR state to a first recovered side;
reaching, by the first recovered side, the WTR state upon receiving the information about transition to the WTR state from the second recovered side if a current state of the first recovered side is a first NR state and if a state prior to transition to the first NR state is an SF state, where the first NR state is NR (r/b=normal), namely, a No Request state of selecting a protection channel, and the SF state is SF (r/b=normal), namely, a Signal Fail state of selecting a protection channel; and
switching the first recovered side and the second recovered side from the protection channel back to a working channel respectively by depending on which side exhausts a WTR time later.

Further, an automatic protection switching device provided in an embodiment of the present invention includes:
a WTR state unit, configured to reach a WTR state when a first recovered side receives information about transition to the WTR state from a second recovered side if a current state of the first recovered side is a first NR state and if a state prior to transition to the first NR state is an SF state; and a switching unit, configured to get the first recovered side into a second NR state upon expiry of a WTR time of the first recovered side after the first recovered side receives WTR time expiry information sent by the second recovered side, where the second NR state is a No Request state of selecting a working channel.

Further, another automatic protection switching device provided in an embodiment of the present invention includes:

an information sending unit, configured to: when a second recovered side reaches a WTR state, send information about transition to the WTR state to a first recovered side to get the first recovered side into the WTR state; and a switching unit, configured to get the second recovered side into a second NR state upon expiry of a WTR time of the second recovered side after the second recovered side receives WTR time expiry information sent by the first recovered side, where the second NR state is a No Request state of selecting a working channel.

Further, a system for switching an APS service channel in an embodiment of the present invention includes: a first recovered side and a second recovered side, where The first recovered side is configured to reach a WTR state upon receiving information about transition to the WTR state from the second recovered side if a current state of the first recovered side is a first NR state and if a state prior to transition to the first NR state is an SF state, and reach a second NR state upon expiry of a WTR time of the first recovered side after receiving WTR time expiry information sent by the second recovered side, where the first NR state is a No Request state of selecting a protection channel, the second NR state is a No Request state of selecting a working channel, and the SF state is a Signal Fail state of selecting a protection channel; and The second recovered side is configured to: when reaching the WTR state, send information about transition to the WTR state to the first recovered side to get the first recovered side into the WTR state; and reach a second NR state upon expiry of a WTR time of the second recovered side after receiving WTR time expiry information sent by the first recovered side.

Compared with the prior art, the embodiments of the present invention bring the following benefits: the first recovered side reaches the WTR state upon receiving information about transition to the WTR state from the second recovered side if the current state of the first recovered side is the first NR state NR (r/b=normal), and if the state prior to transition to the first NR state is SF (r/b=normal); and, when the WTR time of both sides expires, the first recovered side reaches the second NR state NR (r/b=null). Therefore, the user can know the WTR state of the first recovered side clearly; and, when the WTR time set on the first recovered side is greater than the WTR time set on the second recovered side, the service is not switched back to the working channel until the WTR time of the first recovered side expires, thereby meeting the customer requirement of switching back to the working channel upon expiry of the WTR time after the working channel recovers from the fault.

DETAILED DESCRIPTION

To make the technical solution, objectives and advantages of the present invention more comprehensible, the following describes the present invention in more detail with reference to accompanying drawings and preferred embodiments. Understandably, the embodiments described herein are intended to interpret the present invention rather than restrict the present invention.

The implementation of the present invention is described in detail below with reference to exemplary embodiments:

Embodiment 1

Figure 1:
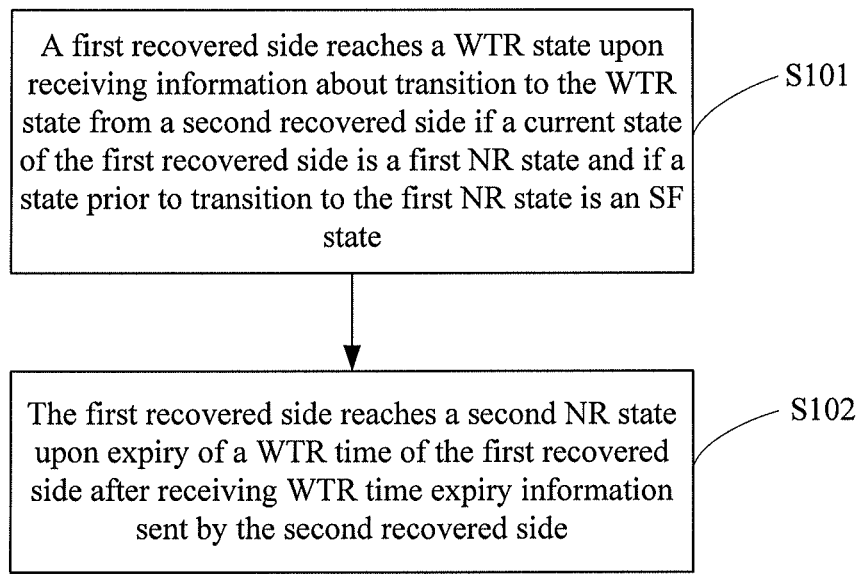
FIG. 1 is a flowchart of implementing a method for switching an APS service channel according to a first embodiment of the present invention.

The application scenario of this embodiment may be: For automatic protection switching (Automatic Protection Switching, APS) such as Multi-Protocol Label Switching (Multi-Protocol Label Switching, MPLS) and Ethernet (Ethernet, ETH), when a signal fault occurs on both sides of a protection group, if the two sides do not recover from the fault simultaneously, the first recovered side generally switches from the protection channel to the working channel directly upon expiry of the WTR time of the second recovered side. Therefore, the first recovered side switches from the protection channel to the working channel directly without waiting for a WTR time. In order for the first recovered side not to switch from the protection channel to the working channel until the WTR time expires, the first recovered side may reach the WTR state according to its own conditions after receiving information about transition to the WTR state from the second recovered side, thereby making the first recovered side not switch back to the working channel until the WTR time expires. The process of identifying the first recovered side and the second recovered side is as follows: after a signal fault occurs on both sides of the APS switching group, when one side of the protection switching group detects revertive, if a packet signal received from the peer side is in an SF state, it is determined that this side is the first recovered side; when one side of the protection switching group detects revertive, if a packet signal received from the peer side is in a No Request state of selecting a protection channel, it is determined that this side is the second recovered side. FIG. 1 is a flowchart of implementing a method for switching an APS service channel according to a first embodiment of the present invention, which is detailed below:

S101. A first recovered side reaches a WTR state upon receiving information about transition to the WTR state from a second recovered side if a current state of the first recovered side is a first NR state and if a state prior to transition to the first NR state is an SF state, where the first NR state is a No Request state of selecting a protection channel, namely, NR (r/b=normal), and the SF state is a Signal Fail state of selecting a protection channel, namely, SF (r/b=normal).

In this embodiment, the information about local transition to the WTR state may be the WTR switching request information of distal side, and the priority level of the WTR switching request information received by the local first recovered side is higher than the priority level of other local switching request information.

In this embodiment, transition between various states of the APS may occur according to a preset state machine.

S102. The first recovered side reaches a second NR state upon expiry of a WTR time of the first recovered side after receiving WTR time expiry information sent by the second recovered side, where the second NR state is a No Request state of selecting a working channel.

In this embodiment, the first recovered side reaches the second NR state when two conditions are fulfilled: The first recovered side receives WTR time expiry information sent by the second recovered side, and the WTR time of the first recovered side expires. The order of checking the two conditions is not fixed. It is appropriate that the first recovered side receives the WTR time expiry information sent by the second recovered side, and then waits for expiry of the WTR time of the first recovered side, whereupon the first recovered side reaches the second NR state; or, the WTR time of the first recovered side expires, and then the first recovered side waits for the WTR time expiry information from the second recovered side, whereupon the first recovered side reaches the second NR state.

Understandably, the WTR time of the first recovered side and the WTR time of the second recovered side may be preset according to actual conditions, which shall not be construed as a limitation on the present invention.

To put it clearly, the APS mode in this embodiment is a 1+1 bidirectional revertive mode or a 1:1 bidirectional revertive mode.

In this embodiment, the first recovered side reaches the WTR state upon receiving information about transition to the WTR state from the second recovered side if the current state of the first recovered side is NR (r/b=normal) and the state prior to transition to the first NR state is SF (r/b=normal); and, when the WTR time of both sides expires, the first recovered side reaches the second NR state. Therefore, the user can know the WTR state of the first recovered side clearly; and, when the WTR time set on the first recovered side is greater than the WTR time set on the second recovered side, the service is not switched back to the working channel until the WTR time of the first recovered side expires, thereby meeting the customer requirement of switching back to the working channel upon expiry of the WTR time after the working channel recovers from the fault.

Embodiment 2

Figure 2:
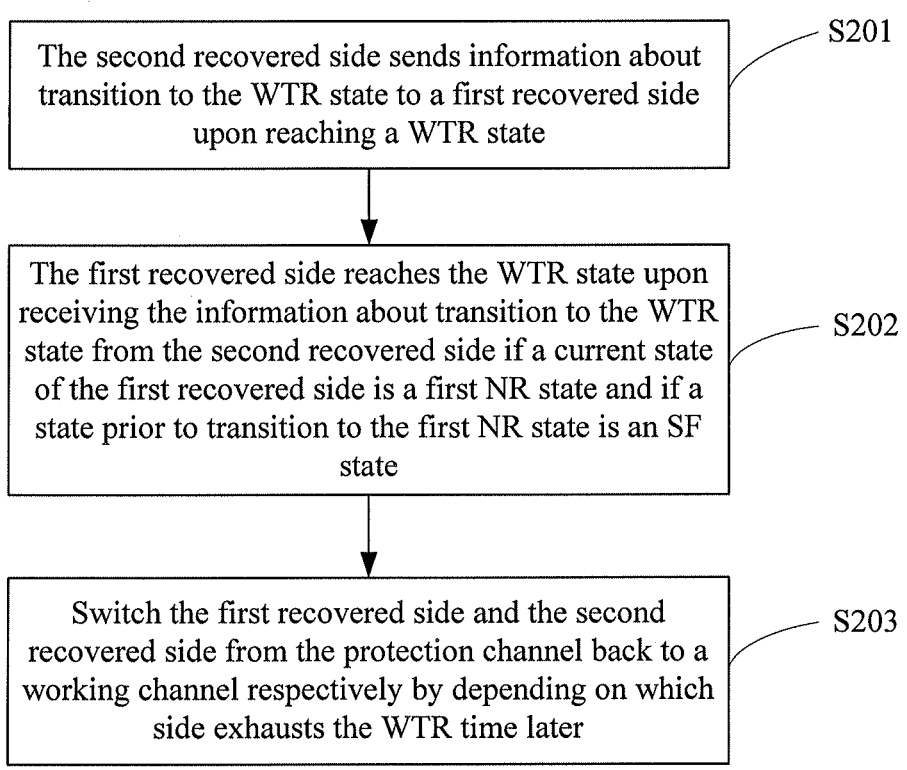
FIG. 2 is a flowchart of implementing a method for switching an APS service channel according to a second embodiment of the present invention.

FIG. 2 is a flowchart of implementing a method for switching an APS service channel according to a second embodiment of the present invention. The application scenario of this embodiment may be the same as the application scenario of the first embodiment. The following describes the process of switching the APS service channel, supposing that the first recovered side interacts with the second recovered side.

In S201, the second recovered side sends information about transition to the WTR state to a first recovered side upon reaching a WTR state.

S202. The first recovered side reaches the WTR state upon receiving the information about transition to the WTR state from the second recovered side if a current state of the first recovered side is a first NR state and if a state prior to transition to the first NR state is an SF state, where the first NR state is NR (r/b=normal), namely, a No Request state of selecting a protection channel, and the SF state is SF (r/b=normal), namely, a Signal Fail state of selecting a protection channel.

S203. Switch the first recovered side and the second recovered side from the protection channel back to a working channel respectively by depending on which side exhausts a WTR time later.

Figure 3:
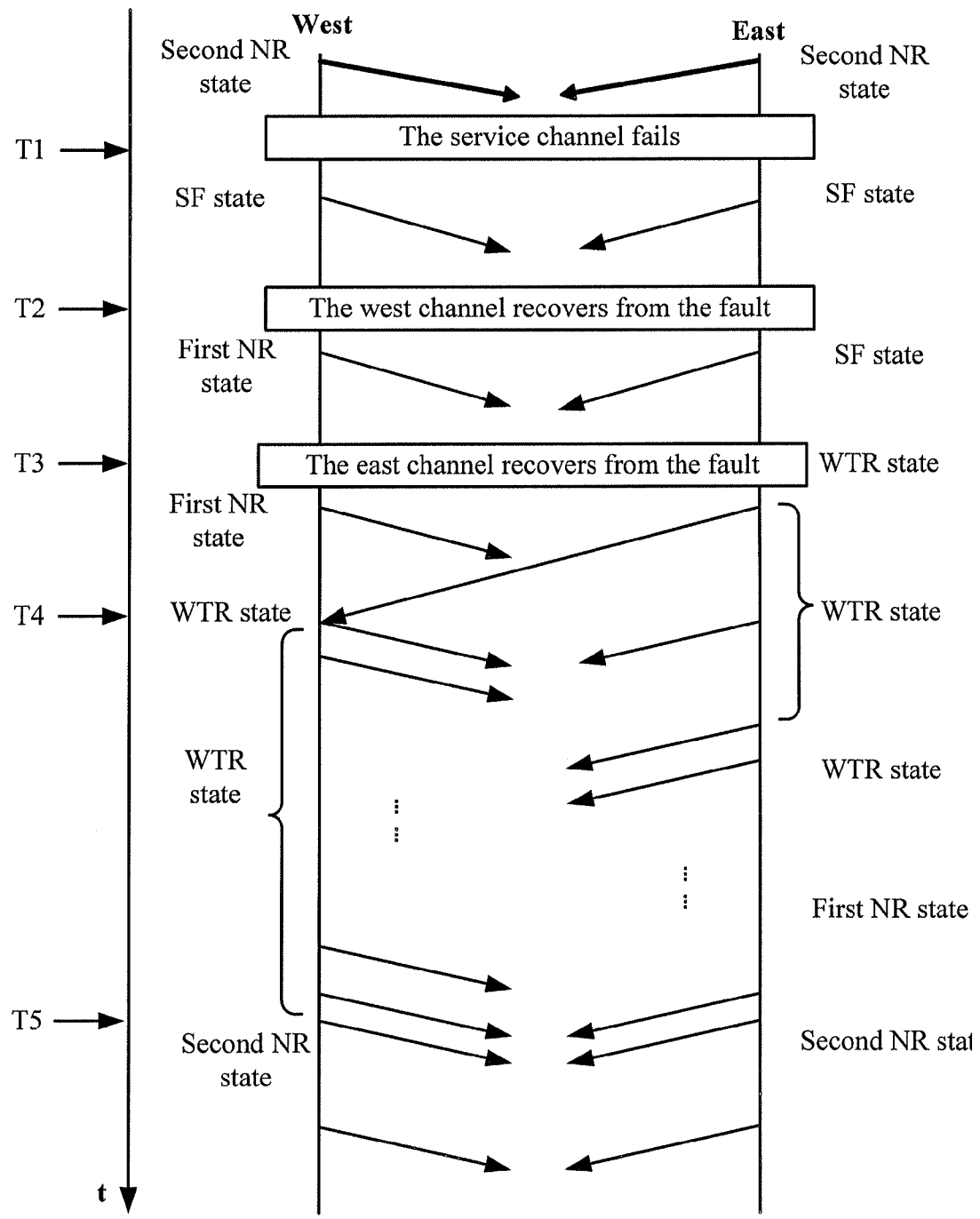
FIG. 3 is a flowchart of implementing an example of a method for switching an APS service channel according to a second embodiment of the present invention.

For ease of understanding, the following interprets this embodiment with an example, and the example shall not be construed as a limitation on the present invention. As shown in FIG. 3, it is assumed that two switching nodes exist in the network. The east (East) switching node is a first recovered side, and the west (West) switching node is a second recovered side. The APS mode of every node is 1+1 bidirectional revertive mode or 1:1 bidirectional revertive mode. The vertical line is a time axis, the WTR time of the first recovered side is set to 5 min, and the WTR time of the second recovered side is set to 2 min. The process is detailed below:

At time T1, both sides fail and get into a fault state, namely, SF (r/b=normal);

At time T2, the west (WEST) working channel recovers from the fault, and reaches a first NR state, namely, NR (r/b=normal), and the east (EAST) working channel keeps the SF state, namely, SF (r/b=normal);

At time T3, the east (EAST) working channel recovers from the fault, and receives information about transition to the first NR state, namely, NR (r/b=normal) from the west side, and therefore, the east side reaches the WTR state, namely, WTR (r/b=normal);

At time T4, the current state of the west side is the first NR state namely, NR (r/b=normal); when receiving information indicating that the east side is in a WTR state, namely, WTR (r/b=normal), the west side reaches the WTR state namely, WTR (r/b=normal) when determining that the current state of the west side is the first NR state and the state prior to transition to the first NR state is an SF state, namely, SF (r/b=normal).

In a period afterward, the WTR time of the east side is 2 min, and the WTR time of the west side is 5 min, and therefore, the WTR time of the east side expires first; when the WTR time of the east side expires, and the east side receives information indicating that the west side is in the WTR state, namely, WTR (r/b=normal), the east side reaches the first NR state, namely, NR (r/b=normal); and At time T5, the WTR time of the west side expires, and the west side receives information indicating that the peer side is in the first NR state, namely, NR (r/b=normal), and therefore, the west side reaches the second NR state, namely, NR (r/b=null); at this time, the current state of the east side is the first NR state, namely, NR (r/b=normal), and the east side reaches the NR (r/b=null) state upon receiving information indicating that the west side reaches the second NR state, namely, NR (r/b=null); now, both sides reach the second NR state.

Understandably, in this embodiment, it is set that the WTR time of the first recovered side is greater than the WTR time of the second recovered side; however, it is also appropriate to set that the WTR time of the first recovered side is less than the WTR time of the second recovered side, which may be preset according to actual conditions and shall not be construed as a limitation on the present invention.

For ease of understanding, Table 1 shows APS state transition of the east side and the west side in the second embodiment.

Table 1 APS state transition of east side and west side

TABLE 1

| WEST | EAST |
| --- | --- |
| SF (r/b = normal) | SF (r/b = normal) |
| NR (r/b = normal) | SF (r/b = normal) |
| NR (r/b = normal) | WTR (r/b = normal) |

TABLE 1-continued

| WEST | EAST |
|---|---|
| WTR (r/b = normal) | WTR (r/b = normal) |
| WTR (r/b = normal) | NR (r/b = normal) |
| NR (r/b = null) | NR (r/b = normal) |
| NR (r/b = null) | NR (r/b = null) |

In this embodiment, the west side reaches the WTR state upon receiving information about transition to the WTR state from the east side if the current state of the west side is first NR state, namely, NR (r/b=normal), and if the state prior to transition to the first NR state is SF (r/b=normal); no channel is switched when the WTR time of the east side expires; when the WTR time of the west side expires, the west side reaches the second NR state, and the east side also reaches the second NR state at the same time. Therefore, the service is not switched back to the working channel until the WTR time of the west side also expires, thereby meeting the customer requirement of switching back to the working channel upon expiry of the WTR time of both sides after the working channel recovers from the fault.

Embodiment 3

Figure 4:
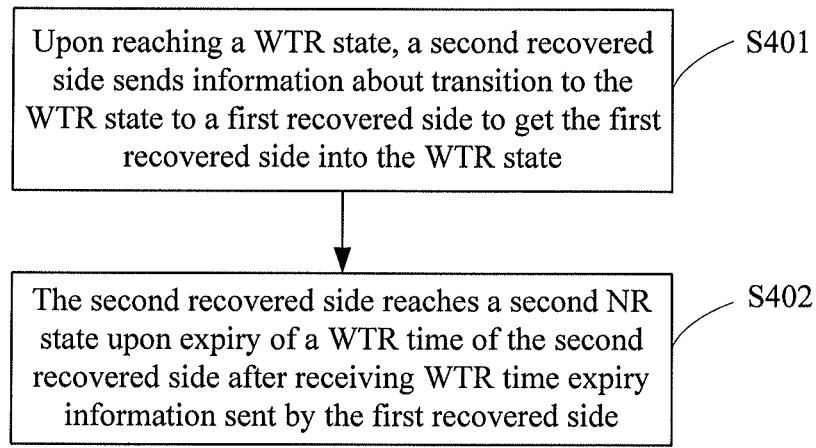
FIG. 4 is a flowchart of implementing a method for switching an APS service channel according to a third embodiment of the present invention.

FIG. 4 is a flowchart of implementing a method for switching an APS service channel according to a third embodiment of the present invention, which is detailed below:

In S401, upon reaching a WTR state, a second recovered side sends information about transition to the WTR state to a first recovered side to get the first recovered side into the WTR state.

S402. Upon expiry of a WTR time of the second recovered side, the second recovered side reaches a second NR state after receiving WTR time expiry information sent by the first recovered side, where the second NR state is a No Request state of selecting a working channel.

The APS mode in this embodiment is a 1+1 bidirectional revertive mode or a 1:1 bidirectional revertive mode.

In this embodiment, the second recovered side reaches the second NR state upon expiry of the WTR time of the second recovered side after receiving the WTR time expiry information sent by the first recovered side. Therefore, when the WTR time set on the first recovered side is greater than the WTR time set on the second recovered side, the service on both sides is not switched back to the working channel until the WTR time of the first recovered side expires, thereby meeting the customer requirement of switching back to the working channel upon expiry of the WTR time after the working channel recovers from the fault.

Embodiment 5

Figure 5:
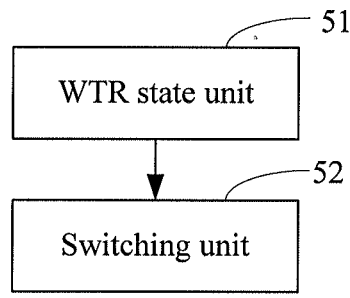
FIG. 5 is a structural diagram of an automatic protection switching device according to a fifth embodiment of the present invention.

FIG. 5 is a structural diagram of an automatic protection switching device according to a fifth embodiment of the present invention. For ease of description, FIG. 5 shows only the part related to this embodiment. The automatic protection switching device includes a WTR state unit 51 and a switching unit 52.

The WTR state unit 51 is configured to get the first recovered side into a WTR state when a first recovered side receives information about transition to the WTR state from a second recovered side if a current state of the first recovered side is a first NR state and if a state prior to transition to the first NR state is an SF state.

In this embodiment, the WTR state unit 51 may switch between various states of APS according to a preset state machine.

The switching unit 52 gets the first recovered side into a second NR state upon expiry of a WTR time of the first recovered side after receiving WTR time expiry information sent by the second recovered side, where the second NR state is a No Request state of selecting a working channel.

In this embodiment, the first recovered side reaches the second NR state when two conditions are fulfilled: The first recovered side receives WTR time expiry information sent by the second recovered side, and the WTR time of the first recovered side expires. The order of checking the two conditions is not fixed. It is appropriate that the first recovered side receives the WTR time expiry information sent by the second recovered side, and then waits for expiry of the WTR time of the first recovered side, whereupon the switching unit 52 gets the first recovered side into the second NR state; or, the WTR time of the first recovered side expires, and then the first recovered side waits for the WTR time expiry information from the second recovered side, whereupon the switching unit 52 gets the first recovered side into the second NR state.

To put it clearly, the APS mode in this embodiment is a 1+1 bidirectional revertive switching mode or a 1:1 bidirectional revertive switching mode.

In this embodiment, the first recovered side reaches the WTR state upon receiving information about transition to the WTR state from the second recovered side if the current state of the first recovered side is the first NR state, namely, NR (r/b=normal), and if the state prior to transition to the first NR state is SF (r/b=normal); and, when the WTR time of both sides expires, the first recovered side reaches the second NR state. Therefore, the user can know the WTR state of the first recovered side clearly; and, when the WTR time set on the first recovered side is greater than the WTR time set on the second recovered side, the service is not switched back to the working channel until the WTR time of the first recovered side expires, thereby meeting the customer requirement of switching back to the working channel upon expiry of the WTR time after the working channel recovers from the fault.

Embodiment 6

Figure 6:
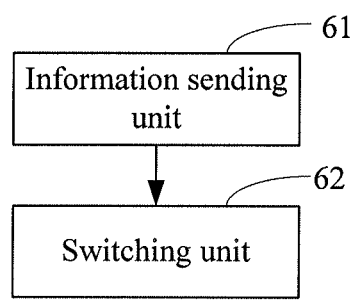
FIG. 6 is a structural diagram of an automatic protection switching device according to a sixth embodiment of the present invention.

FIG. 6 is a structural diagram of an automatic protection switching device according to a sixth embodiment of the present invention. For ease of description, FIG. 6 shows only the part related to this embodiment. The automatic protection switching device includes an information sending unit 61 and a switching unit 62.

When a second recovered side reaches a WTR state, the information sending unit 61 sends information about transition to the WTR state to a first recovered side to get the first recovered side into the WTR state.

The switching unit 62 gets the second recovered side into a second NR state upon expiry of a WTR time of the second recovered side after receiving WTR time expiry information sent by the first recovered side, where the second NR state is a No Request state of selecting a working channel.

To put it clearly, the APS mode in this embodiment is a 1+1 bidirectional revertive switching mode or a 1:1 bidirectional revertive switching mode.

Embodiment 7

A system for switching an APS service channel is provided in this embodiment. The system for switching the APS service channel includes a first recovered side and a second recovered side.

The first recovered side is configured to reach a WTR state upon receiving information about transition to the WTR state from the second recovered side if a current state of the first recovered side is a first NR state and if a state prior to transition to the first NR state is an SF state, and reach a second NR state upon expiry of a WTR time of the first recovered side after receiving WTR time expiry information sent by the second recovered side, where the first NR state is a No Request state of selecting a protection channel, the second NR state is a No Request state of selecting a working channel, and the SF state is a Signal Fail state of selecting a protection channel.

When reaching the WTR state, the second recovered side sends information about transition to the WTR state to the first recovered side to get the first recovered side into the WTR state; and the second recovered side reaches a second NR state upon expiry of a WTR time of the second recovered side after receiving WTR time expiry information sent by the first recovered side.

Overall, the embodiments of the present invention bring the following benefits:

The first recovered side reaches the WTR state upon receiving information about transition to the WTR state from the second recovered side if the current state of the first recovered side is NR (r/b=normal), and if the state prior to transition to the first NR state is SF (r/b=normal); and, when the WTR time of both sides expires, the first recovered side reaches the second NR state. Therefore, the user can know the WTR state of the first recovered side clearly; and, when the WTR time set on the first recovered side is greater than the WTR time set on the second recovered side, the service is not switched back to the working channel until the WTR time of the first recovered side expires, thereby meeting the customer requirement of switching back to the working channel upon expiry of the WTR time after the working channel recovers from the fault.

In the foregoing embodiments, the units in the system and the device are defined according to functional logics only, but the embodiments of the present invention are not limited to such a defining mode. Any defining mode of the units is appropriate only if the corresponding functions are implemented properly. In addition, the names of the function units are defined for ease of identification only, but are not intended to restrict the protection scope of the present invention.

Persons of ordinary skill in the art understand that all or part of the steps of the method for switching an APS service channel according to the embodiments of the present invention may be implemented by a program instructing relevant hardware, for example, by a computer-executable program. The program may be stored in a readable storage medium such as RAM, magnetic disk, or CD-ROM.

People skilled in this art can understand that: the implementation of all or part of the steps in the above-mentioned method embodiments can be completed by hardware related to program instructions. The program may be stored in a computer readable storage medium. During running, the program executes the steps comprising the above-mentioned method embodiments. The storage medium comprises the various media which are able to store program codes such as ROM, RAM, diskette or compact disc, etc.

What is claimed is:

1. A method for switching an automatic protection switching (APS) service channel, comprising:

reaching, by a processor of a first recovered node in a telecommunication network, a wait-to-restore (WTR) state upon receiving information about transition to the WTR state from a second recovered node if a current state of the first recovered node is a first No Request (NR) state and if a state prior to transition to the first NR state is an Signal Fail (SF) state, wherein the first NR state is a No Request state of selecting a protection channel, and the SF state is a Signal Fail state of selecting a protection channel; and reaching, by the processor of the first recovered node upon expiry of a WTR time of the first recovered node, a second NR state after receiving WTR time expiry information sent by the second recovered node, wherein the second NR state is a No Request state of selecting a working channel.

2. The method according to claim 1, wherein:
a mode of the APS is a 1+1 bidirectional revertive mode or a 1:1 bidirectional revertive switching mode.

3. A method for switching an automatic protection switching (APS) service channel, comprising:

sending, by a processor of a second recovered node upon reaching a wait-to-restore (WTR) state, information about transition to the WTR state to a first recovered node to get the first recovered node into the WTR state; and reaching, by the processor of the second recovered node upon expiry of a WTR time of the second recovered node, a second No Request (NR) state after receiving WTR time expiry information sent by the first recovered node, wherein the second NR state is a No Request state of selecting a working channel.

4. The method according to claim 3, wherein:
a mode of the APS is a 1+1 bidirectional revertive switching mode or a 1:1 bidirectional revertive switching mode.

5. A method for switching an automatic protection switching (APS) service channel, comprising:

sending, by a processor of a second recovered node in a telecommunication network, upon reaching a wait-to-restore (WTR) state, information about transition to the WTR state to a first recovered node;

reaching, by the processor of the first recovered node, the WTR state upon receiving the information about transition to the WTR state from the second recovered node if a current state of the first recovered node is a first No Request (NR) state and if a state prior to transition to the first NR state is a Signal Fail (SF) state, wherein the first NR state is NR, which is a No Request state of selecting a protection channel, and the SF state is SF, which is a Signal Fail state of selecting a protection channel; and switching the first recovered node and the second recovered node from the protection channel back to a working channel respectively by depending on which node exhausts a WTR time later.

6. An automatic protection switching device, comprising a processor and a non-transitory storage medium configured to store units comprising:

a wait-to-restore (WTR) state unit, configured to reach a WTR state when a first recovered node receives information about transition to the WTR state from a second recovered node if a current state of the first recovered node is a first No Request (NR) state and if a state prior to transition to the first NR state is a Signal Fail (SF) state; and a switching unit, configured to get the first recovered node into a second NR state upon expiry of a WTR time of the first recovered node after the first recovered node receives WTR time expiry information sent by the second recovered node, wherein the second NR state is a No Request state of selecting a working channel.

7. The automatic protection switching device according to claim 6, wherein:
a mode of the APS is a 1+1 bidirectional revertive switching mode or a 1:1 bidirectional revertive switching mode.

8. An automatic protection switching device, comprising a processor and a non-transitory storage medium configured to store units comprising:
an information sending unit, configured to: when a second recovered node reaches a wait-to-restore (WTR) state, send information about transition to the WTR state to a first recovered node to get the first recovered node into the WTR state; and
a switching unit, configured to get the second recovered node into a second NR state upon expiry of a WTR time of the second recovered node after the second recovered node receives WTR time expiry information sent by the first recovered node, wherein the second NR state is a No Request state of selecting a working channel.

9. The automatic protection switching device according to claim 8, wherein:
a mode of the APS is a 1+1 bidirectional revertive switching mode or a 1:1 bidirectional revertive switching mode.

10. A system for switching an APS service channel, comprising a first recovered node and a second recovered node, wherein:
the first recovered node comprising a processor configured to reach a wait-to-restore (WTR) state upon receiving information about transition to the WTR state from the second recovered node if a current state of the first recovered node is a first No Request (NR) state and if a state prior to transition to the first NR state is a Signal Fail (SF) state, and reach a second NR state upon expiry of a WTR time of the first recovered node after receiving WTR time expiry information sent by the second recovered node, wherein the first NR state is a No Request state of selecting a protection channel, the second NR state is a No Request state of selecting a working channel, and the SF state is a Signal Fail state of selecting a protection channel; and
the second recovered node comprising a processor is configured to: when reaching the WTR state, send information about transition to the WTR state to the first recovered node to get the first recovered node into the WTR state; and reach a second NR state upon expiry of a WTR time of the second recovered node after receiving WTR time expiry information sent by the first recovered node.

\* \* \* \* \*